US008938212B2

(12) United States Patent  
Peisa et al.

(10) Patent No.: US 8,938,212 B2
(45) Date of Patent: Jan. 20, 2015

(54) METHOD AND APPARATUS FOR MEASUREMENT OF ACTIVE USER DEVICES PER QUALITY-OF-SERVICE CLASS INDICATOR

(71) Applicant: Lenovo Group Limited, Quarry Bay (HK)

(72) Inventors: Janne Peisa, Espoo (FI); Octavio Jose De Franca Lima, The Colony, TX (US); Noel Kenehan, Stockholm (SE); Andreas Olsson, Stockholm (SE); Erik Westerberg, Enskede (SE)

(73) Assignee: Lenovo Group Limited, Quarry Bay (HK)

( * ) Notice: Subject to any disclaimer, the term of this patent is extended or adjusted under 35 U.S.C. 154(b) by 0 days.

(21) Appl. No.: 14/180,718

(22) Filed: Feb. 14, 2014

(65) Prior Publication Data

US 2014/0162594 A1    Jun. 12, 2014

Related U.S. Application Data

(63) Continuation of application No. 13/147,461, filed as application No. PCT/SE2009/051383 on Dec. 7, 2009, now Pat. No. 8,688,073.

(60) Provisional application No. 61/149,447, filed on Feb. 3, 2009.

(51) Int. Cl.
*H04M 11/00* (2006.01)
*H04W 24/08* (2009.01)
*H04W 84/04* (2009.01)

(52) U.S. Cl.
CPC ............ *H04W 24/08* (2013.01); *H04W 84/042* (2013.01)
USPC .................... 455/405; 455/452.1; 455/452.2; 455/517

(58) Field of Classification Search
CPC .............................. H04W 24/08; H04W 84/02
USPC .......................... 455/405, 452.1, 452.2, 517
See application file for complete search history.

(56) References Cited

U.S. PATENT DOCUMENTS

2008/0004058 A1\* 1/2008 Jeong et al. ................... 455/517
2008/0304447 A1\* 12/2008 Kim et al. ..................... 370/329
(Continued)

FOREIGN PATENT DOCUMENTS

CN         101060690 A    10/2007

OTHER PUBLICATIONS

Huawei, "Introduction of QoS Measurements", 3GPP TSG RAN WG2 #64, Nov. 10, 2008, pp. 1-12, R2-086821, 3GPP, Prague, Czech Republic.
(Continued)

*Primary Examiner* — Barry Taylor
(74) *Attorney, Agent, or Firm* — Ference & Associates LLC

(57) ABSTRACT

Methods, apparatus, and systems for measuring, on a per-QoS-class basis, the average number of user devices active on the uplink of a wireless communication system are disclosed. In an exemplary method, a number of mobile terminals with buffered data for transmission to a base station is estimated based on received buffer status reports. An estimated quantity of active mobile terminals is calculated, based on the received buffer status reports and a number of mobile terminals for which a semi-persistent scheduling grant has been granted. In some embodiments, the estimated quantity of active mobile terminals is estimated on a per-traffic-class basis, in which case the technique includes calculating first and second estimated quantities, corresponding to mobile terminals having active data bearers for first and second traffic classes, respectively, based on the received buffer status reports and the number of mobile terminals for which a semi-persistent scheduling grant has been granted.

14 Claims, 3 Drawing Sheets

(56) References Cited

U.S. PATENT DOCUMENTS

2009/0196275 A1    8/2009  Damnjanovic et al.
2012/0099546 A1*   4/2012  Cho et al. .................. 370/329

OTHER PUBLICATIONS

3rd Generation Partnership Project, "3rd Generation Partnership Project; Technical Specification Group Radio Access Network; Evolved Universal Terrestrial Radio Access (E-UTRA); Layer 2—Measurements (Release 8)", 3GPP TS 36.314 V8.0.1, Jan. 1, 2009, pp. 1-15, 3GPP, France.

3rd Generation Partnership Project, "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.4.0, Dec. 1, 2008, pp. 1-43, 3GPP, France.

Ericsson, "Definition of Active UE per QCI in uplink", 3GPP TSG-RAN WG2 #65, Athens, Greece, Feb. 9, 2009, pp. 1-3, Tdoc R2-091306, 3GPP.

Ericsson, "Correction to the definition of the Number of active UEs per QCI in UL", 3GPP TSG-RAN2 Meeting #65, Athens, Greece, Feb. 9, 2009, pp. 1-3, R2-091307, 3GPP.

3rd Generation Partnership Project, "3rd Generation Partnership Project; Technical Specification Group Radio Access Network, Evolved Universal Terrestrial Radio Access (E-UTRA), Layer 2—Measurements (Release 8)", 3GPP TS 36.314 V8.0.0, Dec. 1, 2008, pp. 1-15, 3GPP, France.

* cited by examiner

METHOD AND APPARATUS FOR MEASUREMENT OF ACTIVE USER DEVICES PER QUALITY-OF-SERVICE CLASS INDICATOR

This application is a continuation application of pending U.S. application Ser. No. 13/147461, filed 2 Aug. 2011, which was the National Stage of International Application PCT/SE2009/051383, filed 7 Dec. 2009, which claims priority to U.S. Provisional Application No. 61/149447, filed 3 Feb. 2009, the disclosures of each of which are incorporated by reference herein in their entireties.

TECHNICAL FIELD

The techniques described herein relate generally to communication systems and are more particularly related to measurements in a base station of mobile terminal activity in the uplink of a wireless network, especially for Long Term Evolution (LTE) systems specified by the 3rd-Generation Partnership Project (3GPP).

BACKGROUND

In LTE systems, a scheduler resides in the base station and is responsible for dynamically assigning transmission resources to mobile terminals. Generally, the base station makes scheduling decisions for each one-millisecond transmission time interval, and sends scheduling information to the scheduled mobile terminals for each interval. To reduce the signaling overhead involved with the transmission of this scheduling information, semi-persistent scheduling is used in some circumstances, particularly when the traffic associated with a particular service (e.g., voice-over-IP, or VOIP) is relatively predictable and characterized by regular transmissions of small payloads. Thus, a semi-persistent scheduling grant indicates to a mobile terminal that it has been allocated a particular quantity and set of uplink resources, and that this allocation applies to every n-th subframe until the terminal is notified otherwise.

To perform its scheduling tasks efficiently, the scheduler needs information about each mobile station's current buffer status, i.e., whether each mobile station has data queued for transmission, and, if so, how much. In LTE, buffer status reports are provided to the base station by scheduled mobile stations as part of the control element headers associated with an uplink transport block transmission. Buffer status reports can be triggered for various reasons, including: a change in buffered data priority in the mobile station (e.g., data having a higher priority than any currently buffered data "arrives" at the transmission buffer); a change in serving cell; and/or expiration of a periodic timer. In addition, when the amount of padding that would be required to make an uplink transport block fit the scheduled transport block size exceeds the size of a buffer status report, a current buffer status report is sent to use the resources that would otherwise be wasted.

The more precise and up-to-date the buffer status information is, the more accurate the scheduling decisions can be. Of course, the buffer status reports provided to the base station by the mobile stations consume system resources as well. Thus, the various buffer status reporting schemes standardized for LTE and other wireless networks reflect a balance between the overhead introduced by the reporting itself and the efficiency gains achieved with the more precise and timely scheduling of resources that is facilitated by the reports. .rIdeally, it would be useful to have buffer information for each logical channel applicable to a given mobile station. Of course, this would require more overhead. Accordingly, logical channels are grouped into logical-channel groups (LCGs) in LTE systems, and buffer status reporting is performed per group. Thus, the buffer-size field in a buffer-status report indicates the total amount of data buffered for transmission for all logical channels in a given LCG (or for four LCGs, in the case of a "long" buffer status report).

LTE base stations are also responsible for ensuring that the necessary quality-of-service (QoS) is met for each radio bearer that it handles. A radio bearer corresponds to an end-to-end IP packet flow between a mobile station and a gateway in the public data network, or PDN. (In implementations of the LTE protocol, the radio link control layer, or RLC, provides services to upper layers of the protocol stack at the radio bearer level. The RLC receives services from the medium access control layer, or MAC, at the level of logical channels. Thus, each logical channel corresponds to a particular radio bearer, which in turn has a one-to-one correspondence to an end-to-end IP flow.) Each bearer has a defined QoS, which is identified by a QoS class identifier, or QCI. The QCI label for a given bearer determinates how it is handled by the base station with regards to priority, packet delay budget, acceptable packet loss rate, and the like. LTE specifies ten different QCIs, each of which is suitable for one of a wide variety of types of services, ranging from conversational voice and conversational video to real-time gaming and Internet browsing.

In order to assess the real-time performance of the network, for support of load balancing and other "tuning" of an LTE network, 3GPP has specified a number of performance measurements that can be made from time to time. All LTE base stations must be capable of making these measurements, which include, for example, measurements of physical resource block (PRB) usage, packet delay, and packet loss. With these measurements, network operators can get a detailed picture of the throughput and performance of the system at any given time.

One of the required measurements specified by 3GPP is an estimate of the "Number of Active UEs per QCI." ("UE," or "user equipment," is 3GPP terminology for the mobile terminal equipment. In the present application, "UE," "mobile terminal," and "mobile station" are used interchangeably unless the context clearly indicates otherwise.) The "Number of Active UEs per QCI" measurement provides an estimate of the number of users sharing the same resources in the system; this estimate may be used provide a detailed view of the throughput and performance of the system at any given time. In early versions of the standards for these measurements, it is explained that the Number of Active UEs per QCI refers to the number of mobile stations for which there is currently buffered data for uplink transmission. This quantity is measured separately for each quality-of-service (QoS) classification for radio traffic. More particularly, the Number of Active UEs per QCI is defined as:

$$M(T, qci, p) = \left[ \frac{\sum_{\forall i} N(i, qci)}{I(T, p)} \right], \quad (1)$$

where M(T, qci, p) is the average number of active UEs in the uplink per QoS Class Identifier, N(i,qci) is the number of UEs for which there is buffered data for a data radio bearer (DRB) having a traffic class of QCI=qci at sampling instance i, p is a sampling period length, I(T, p) is the total number of sampling occasions during time period T.

The 3GPP specifications acknowledge that this quantity is only an estimation, stating that the number of UEs for which there is buffered data is expected to be based on Buffer Status Reporting, analysis of received data and progress of ongoing HARQ transmissions. Finally, the specifications note that when CQI cannot be determined at the time of the sampling occasion, it is expected that CQI is determined after successful reception of data. Thus, the current definitions leave details of a practical implementation unspecified, as the exact estimation process is not defined. In addition, the need in some cases to determine the QCI only after the successful reception of data will generate complex interaction between future data reception and a current sampling instance—in practice, data not yet received may affect a current estimate of the number of active UEs.

SUMMARY

Described below are improved methods, apparatus, and systems for measuring, on a per-QoS-class basis, the average number of user devices active on the uplink of a wireless communication system. According to several embodiments of the present invention, the Number of Active UEs per QCI may be specified and measured in a simple and determinable way that provides more predictable results. In some embodiments of the present invention, the Number of Active UEs per QCI is determined at each sampling instant based on a current need to grant uplink (UL) resources for a given mobile terminal. In some of these embodiments, determining the need to grant resources (i.e., whether the mobile terminal should be granted resources to transmit data) is based on the last received buffer status report (BSR). The LTE base station (known as an "eNodeB") may also take grants previously scheduled for transmission after reception of a given BSR into account when determining the Number of Active UEs. Of course, as discussed above, data actually received after a BSR may also be considered.

In an exemplary method according to some embodiments of the invention, a number of mobile terminals that have buffered data for transmission to a base station is estimated based in part on buffer status reports received from one or more mobile terminals served by the base station. In this exemplary method, an estimated quantity of active mobile terminals is calculated, based on the received buffer status reports and further based on a number of mobile terminals for which a semi-persistent scheduling grant has been granted.

In some embodiments, the estimated quantity of active mobile terminals is estimated on a per-traffic-class basis, in which case the technique includes calculating a first estimated quantity corresponding to mobile terminals having an active data bearer of a first traffic class, and calculating a second estimated quantity, corresponding to mobile terminals having an active data bearer of a second traffic class, based on the received buffer status reports and the number of mobile terminals for which a semi-persistent scheduling grant has been granted. In some of these embodiments, the calculations are based on considering all data radio bearers for a given mobile terminal to be active at the usage of semi-persistent scheduling for the mobile terminal. In others, the calculations are based on considering, for a given mobile terminal, all data radio bearers belonging to a logical channel group with a buffer estimate greater than zero to be active. In still others, the calculations are based on considering, for a given mobile terminal, all data radio bearers belonging to a logical channel group with a buffer estimate greater than zero to be active at the usage of semi-persistent scheduling for the mobile terminal.

In various embodiments, including any of the variants summarized above, calculating the estimated quantity of active mobile terminals is further based on an analysis of received data from one or more terminals, progress of retransmission activity for one or more mobile terminals, or both. In some of these embodiments, the analysis of received data from one or more terminals comprises evaluating activity history over a period of pre-determined length. In some embodiments, including any of those summarized above, the calculations are further based on considering all data radio bearers that are not assigned to a logical channel group to be active if the last received data for that data radio bearer had no padding.

Any of the techniques summarized above and detailed below may be implemented at a base station in a wireless network. Accordingly, base stations configured to carry out one or more of the methods summarized above are contemplated and described herein. Of course, the present invention may be carried out in other ways than those specifically set forth herein without departing from essential characteristics of the invention. The present embodiments are thus to be considered in all respects as illustrative and not restrictive, and all changes coming within the scope of the appended claims are intended to be embraced therein.

DETAILED DESCRIPTION

Although aspects of the present invention are described herein in the context of a Long-Term Evolution (LTE) system as specified by the $3r^d$-Generation Partnership Project (3GPP), those skilled in the art will appreciate that the inventive techniques disclosed herein may be used in other wireless systems. Thus, although terminology from the 3GPP LTE specifications is used throughout the disclosure, this terminology should not be seen as limiting the scope of the invention to only the aforementioned system. Other wireless systems, including Wideband Code-Division Multiple Access (WCDMA) systems, WiMax systems, Ultra Mobile Broadband (UMB) systems, and GSM systems, may also be adapted to exploit the techniques described below. Indeed, it should also be noted that the use of terms such as base station, eNodeB, mobile station, and UE should also be considering non-limiting in the sense that their use herein need not imply that the present inventive techniques are only applicable in systems employing the particular hierarchical architecture of the 3GPP LTE system.

Figure 1:
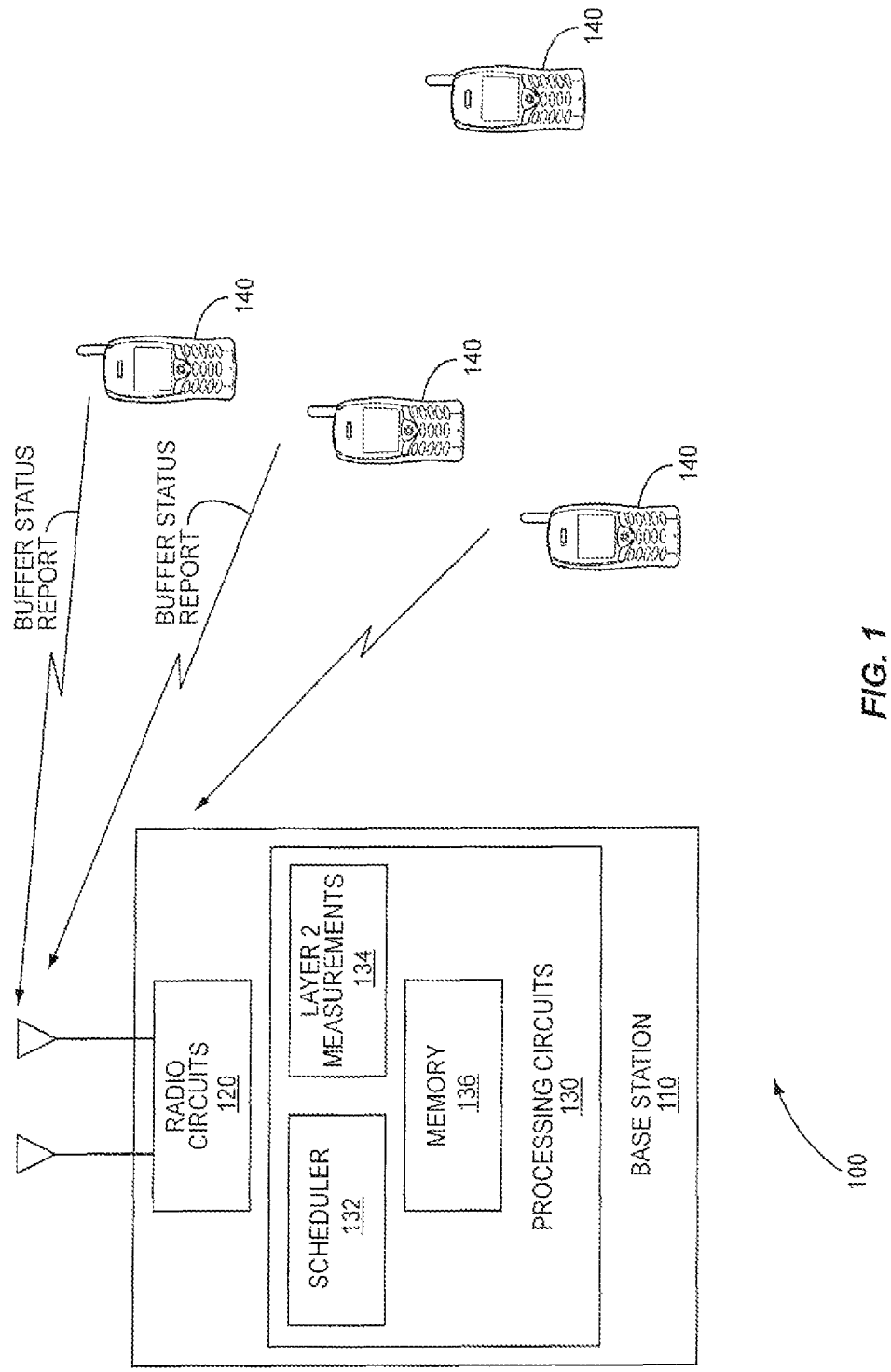
FIG. 1 is a schematic diagram of a wireless network according to some embodiments of the invention.

FIG. 1 is a simplified block diagram of one embodiment of a wireless communication network 100, which includes a base station 110 and several mobile terminals 140. The base station 110 comprises radio circuits 120 and processing circuits 130, the processing circuits 130 in turn comprise, among other things, at least a scheduler function 132, a layer 2 measurements function 134, and memory 136. In some embodiments, processing circuits 130 comprise one or several microprocessors and/or digital signal processors, configured with program code stored in memory 136. Memory 136 may comprise several types of memory in some embodiments, including read-only memory, random-access memory, flash, optical and/or magnetic mass storage devices, etc. Basic designs of processing circuits and radio circuits for use in a base station are well known to those skilled in the art, and are not detailed herein beyond the extent needed for a full understanding of the present invention.

In some embodiments of the present invention the base station 110 of FIG. 1, and, in particular, processing circuits 130, are configured to estimate a quantity of "active" mobile terminals, i.e., mobile terminals that have buffered data for transmission to the base station, based on buffer status reports received from mobile terminals 140 (as shown in FIG. 1) and further based on a number of mobile terminals for which a semi-persistent scheduling grant has been granted by scheduler 132. In some embodiments, quantities of active mobile terminals are estimated for each of several traffic classes corresponding to different quality-of-service levels.

Figure 2:
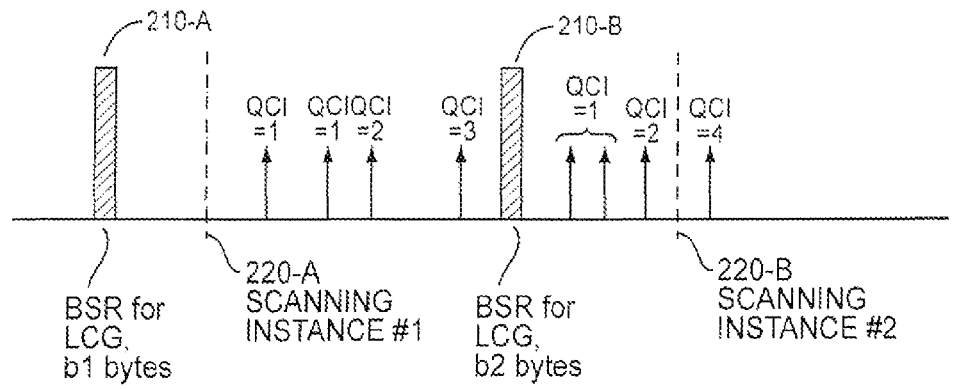
FIG. 2 is an exemplary measurement timing diagram, illustrating the receipt at a base station of buffer status reports and uplink data transmissions for a single mobile terminal.

As discussed above, the 3GPP's current definition of the Number of Active UEs in the UL per QCI measurement is problematic in that it requires determining the QCI after successful reception of data. This problem can be seen in the exemplary measurement timing diagram of FIG. 2, which illustrates a scenario in which four quality-of-service class identifiers (QCIs) are mapped to a single logical channel group. The arrival of a buffer status report (BSR) is indicated with solid blocks 210, while sampling instances 220-A and 220-B are indicated with dashed lines and the reception of data is indicated by arrows labeled with the corresponding QCI. In the pictured situation, it is not possible to use the buffer status reports to determine which QCI is active, but it is necessary to look at the received data after the fact (as indicated in the current 3GPP measurement definition).

As shown in the figure, BSR 210-A is received before scan 1 at sampling instance 220-A; BSR 210-A indicates that b1 bytes of data are buffered for a given logical channel group (LCG). The first reception of data is for a data radio bearer having a traffic class QCI=1, shortly after the sampling instance 220-A, and represents the first set of data to arrive from that logical channel group (LCG) after BSR 210-A has arrived. Although BSR 210-A indicates that data is pending for the LCG as a whole, it doesn't specify the particular QCIs for which data is pending. As a result, the active QCIs must be inferred in order to decide whether the mobile terminal should be considered "active" for any given QCI.

With the hindsight afforded by the illustration, clearly QCI=1 should be considered active as of the sampling instance 220-A—at least some of the b1 buffered data bytes indicated by BSR 210-A correspond to the first transmitted data for QCI=1. Depending on the contents of BSR 210-A and the amount of data received for QCI=1 before reception of data for a data radio bearer having QCI=2 begins, QCI=2 might also be considered active at sampling instance 220-A as well. (For instance, if only a small fraction of b1 bytes is received for QCI=1 before data for QCI=2 is received, then at least some of the b1 buffered data bytes indicated by BSR 210-A likely correspond to QCI=2.) However, the situation for QCI=3 and QCI=4 is much less clear. For QCI=3 and QCI=4 it simply may not be possible to determine whether the data was already in the buffer as of the scanning instance 220-A (but has not been included in uplink transmission due to logical channel prioritization and arrival of new data for QCI=1 and/or QCI=2), or whether the data arrived at the base station just before it was transmitted (and subsequent to the sampling instance 220-A).

The measurement processes under the current 3GPP approach are thus complicated by the requirement for post-sampling occasion handling. Furthermore, no time window defining which post-sampling events should be considered is defined. Thus, as shown by the scenario illustrated in FIG. 2, different implementations by different equipment vendors can lead to different reported results, reducing the benefit of having a standardized measurement in the first place. It is therefore beneficial to replace the current definition with a simplified and more precise definition, leading to more uniform reporting between different vendors.

According to several embodiments of the present invention, the Number of Active UEs per QCI may be specified and measured in a simple and determinable way that provides more predictable results. In some embodiments of the present invention, the Number of Active UEs per QCI is determined at each sampling instant based on a current need to grant uplink (UL) resources for a given mobile terminal. In some of these embodiments, determining the need to grant resources (i.e., whether the mobile terminal should be granted resources to transmit data) can be based on the last received buffer status report (BSR). The eNodeB may also take grants previously scheduled for transmission after reception of a given BSR into account when determining the Number of Active UEs. Of course, as discussed above, data actually received after a BSR may also be considered.

In some embodiments, the eNodeB may also take the need to use grants for semi-persistent scheduling into account when determining the Number of Active UEs per QCI. According to some of these embodiments, all bearers active for a given mobile terminal are considered to be active at the usage of semi-persistent scheduling for that mobile terminal; in others, all bearers that belong to a LCG (logical channel group) having a most recent buffer estimate greater than zero are considered to be active at the usage of semi-persistent scheduling.

The eNodeB may also simplify the calculation of need, in some embodiments, by considering all QCIs within a logical channel group to have the same need, since the BSR report is on a LCG level and does not distinguish between QCIs. Further, the eNodeB may also consider each data radio bearer (DRB) that is not assigned to an LCG to be active, in some embodiments, if the last received data for that DRB had no padding.

With the above variations and possibilities in mind, those skilled in the art will appreciate that an exemplary procedure for measuring the number of UEs that are active for QCI=qci at a given sampling occasion may operate according to the following two-part definition:

An UE is considered active at the sampling occasion if:
the UL buffer estimate for the UE>0 (for a DRB that is not assigned to a LCG: if
the last received data was received without padding), or
the UL was UL grant for semi persistent scheduling.
An UE is considered active in UL for QCI=qci, at the sampling occasion, if:
the UE is considered active at the sampling occasion, and
the UL buffer estimate for a LCG>0 with at least one DRB with QCI=qci in the
LCG (for a DRB that is not assigned to a LCG: if the last received data was received without padding).

Figure 3:
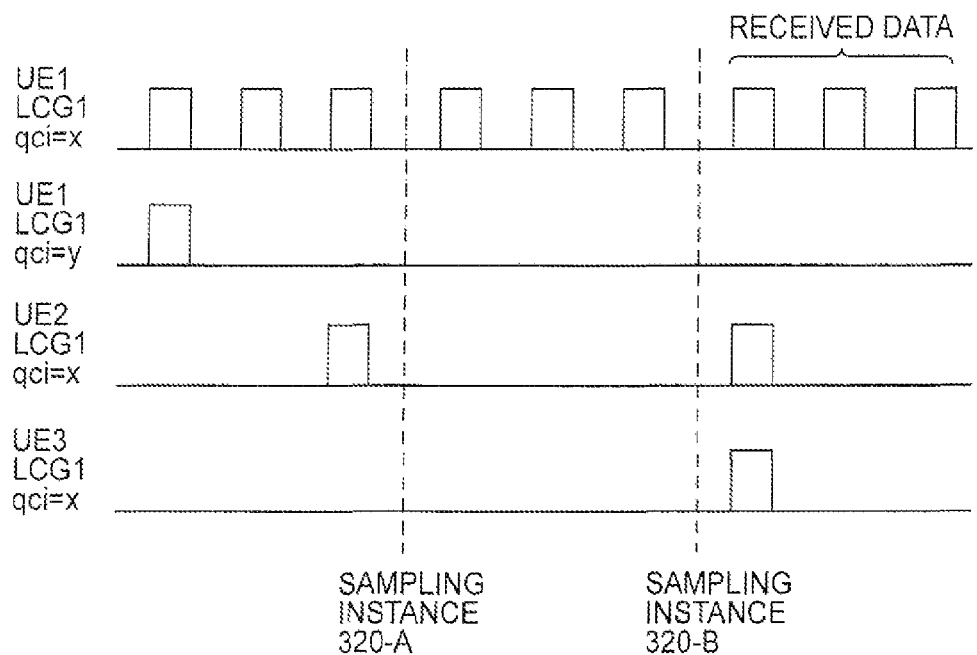
FIG. 3 is another exemplary measurement timing diagram, illustrating the receipt of uplink data transmissions from two mobile terminals.

According to the above procedure and given the scenario in FIG. 3, at sampling instance 320-A, UE1 would be considered active for qci=x as well as for qci=y, assuming the most recent BSR as of sampling instance 320-A indicated buffered data for LCG1. Likewise, at sampling instance 320-B, UE1 would be considered active for qci=x and for qci=y, while UE2 and UE3 would each be considered active for qci=x.

In some embodiments of the invention, the Number of Active UEs per QCI may be determined, at least in part, based on history information of length p. Thus, for each sampling instant, the activity during period p is determined, and mobile terminals with activity during that period are considered active. The period p is not necessarily locked directly to the sampling instant.

As an example of a history-based measurement definition, the Number of Active UEs can be determined in some embodiments to be the "Number of UEs for which data has been successfully received for QCI=qci within last 100 milliseconds of a given sampling occasion." The period p may of course differ from 100 ms. However, the value 100 milliseconds is particularly suitable, as it corresponds to in-session activity time for SAE (System Architecture Evolution) bearers as defined by 3GPP standards. According to this approach, again given the scenario in FIG. 3, at sampling instance 320-A, UE1 would be considered active for qci=x and for qci=y, while UE2 would be considered active for qci=x (assuming a "look-back" from the sampling instance). At sampling instance 320-B, UE1 would be considered active for qci=x.

In still another embodiment of the invention, the Number of Active UEs per QCI is determined based on history information of length p on a logical channel group level. At each sampling instant, the activity during period p is determined, and mobile terminals with activity for a logical channel group during that period are considered active. Again, the period p is not necessarily locked to the sampling time. As an example of history-based measurement definition on a logical channel group level, the Number of Active UEs for a given QCI can be determined as "Number of UEs for which data has been successfully received for a logical channel with QCI=qci belonging to a logical channel group." Given this approach and the scenario illustrated in FIG. 3, at sampling instance 320-A, UE1 would be considered active for qci=x and for qci=y and UE2 would be considered active for qci=x. At sampling instance 320-B, on the other hand, UE1 would be considered active for qci=x and for qci=y.

Figure 4:
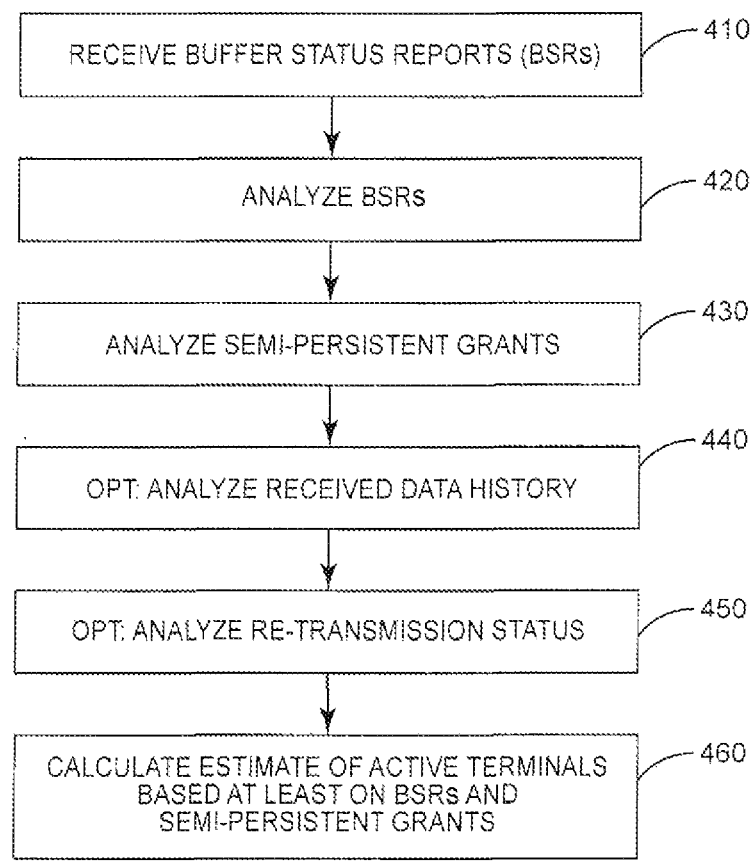
FIG. 4 is a process flow diagram illustrating an exemplary method for estimating a number of active mobile terminals according to some embodiments of the invention.

In view of the techniques discussed above, those skilled in the art will appreciate that FIG. 4 is a process flow diagram illustrating an exemplary procedure for estimating a quantity of mobile terminals that have buffered data for transmission to a base station, i.e., the number of mobile terminals that should be considered "active" at a given estimation time. In some embodiments, this process is implemented at a base station or related network entity. In several embodiments, this embodiment may be carried out on a per-quality-class-indicator level.

The illustrated process begins at blocks 410 and 420, with the receipt and analysis of buffer status reports from one or more mobile terminals. As discussed earlier, a buffer status report may indicate a quantity of buffered data for each of one or more logical channel groups for the mobile terminal, but might not provide information detailing the QCIs that correspond to the buffered data.

At block 430, semi-persistent grants associated with mobile terminals served by the base station are analyzed. As suggested above, a given mobile terminal and/or logical channel group for a mobile terminal may be deemed active if a semi-persistent grant is associated with that mobile terminal and/or logical channel group. In some embodiments, all data radio bearers having QCIs corresponding to such a logical channel group are deemed active with the usage of a semi-persistent grant; in others all data radio bearers for the mobile terminal may be deemed active with the usage of a semi-persistent grant for the mobile terminal.

Optionally, received data history may be analyzed, as shown at block 440, with the results used in the estimate of active mobile terminals at a given sampling instance. In some embodiment, the history may be analyzed for a pre-determined period of length p, where the period may or may not comprise the sampling instance itself. In some embodiments, re-transmission status for one or more mobile terminals may be analyzed and considered in the estimation of active mobile terminals, as shown at block 450. Mobile terminals and/or logical channel groups associated with a pending re-transmission process may be considered active in these embodiments, and included in the estimation of the number of active mobile terminals.

Finally, as shown at block 460, an estimate of active terminals is calculated for a given sampling instance, based at least on the buffer status reports received from mobile terminals and semi-persistent grant information.

Those skilled in the art will appreciate that the techniques described above, and, in particular, the methods generally illustrated by FIG. 4, may be implemented in a base station such as the base station 110 of FIG. 1. Of course, those skilled in the art will appreciate that the details of an LTE eNodeB or other base station, but that a base station configured to carry out one or more of the measurement techniques described herein may comprise the basic elements pictured in FIG. 1, including radio circuits 120, configured according to the LTE specifications (or other system standards) to communicate with one or more UEs, including UEs 140, and processing circuits 130, again configured according to LTE specifications for communicating with UEs and the supporting 3GPP network. In embodiments of the present invention, processing circuits 130 comprise a scheduling function 132 and layer 2 measurements function 134, configured to carry out one or more of the measurement techniques described herein for determining the average number of active UEs in the uplink per QCI. Those skilled in the art will appreciate that processing circuits 130 in general and scheduler 132 and layer 2 measurements function 134 in particular may be implemented using one or several microprocessors, digital signal processors, special-purpose digital hardware, and the like, configured with appropriate software, stored in one or more memory devices 136, and/or firmware, as necessary, to carry out LTE communication protocols and the measurement techniques described.

Those skilled in the art will appreciate that various of the details of the several embodiments described above may be used in others; thus all or portions of some of the techniques described above as separate embodiments may be combined, in some embodiments of the present invention. Of course, although the discussion herein focuses on measurements in LTE base stations, those skilled in the art will appreciate that the disclosed techniques can be applied to other systems where an estimate of the average number of active mobile devices on the uplink, for a given Quality-of-Service class, is needed. Accordingly, the preceding descriptions of various techniques for carrying out uplink these measurements are given for purposes of illustration and example, and those skilled in the art will appreciate that the methods, apparatus, and systems described above can be readily adapted for other systems than those specifically described herein.

Thus, the present invention may be carried out in other ways than those specifically set forth herein without departing from essential characteristics of the invention. Accordingly, the present embodiments are to be considered in all respects as illustrative and not restrictive, and all changes coming within the meaning and equivalency range of the appended claims are intended to be embraced therein.

What is claimed is:

1. A method of estimating a quantity of mobile terminals that have buffered data for transmission to a base station, the method comprising:
   receiving buffer status reports from one or more mobile terminals served by the base station;
   calculating an estimated quantity of active mobile terminals based on the received buffer status reports and on a number of mobile terminals for which a semi-persistent scheduling grant has been granted, wherein the calculating the estimated quantity of active mobile terminals comprises calculating a first estimated quantity corresponding to mobile terminals having an active data bearer of a first traffic class; and
   calculating a second estimated quantity, corresponding to mobile terminals having an active data bearer of a second traffic class, based on the received buffer status reports and the number of mobile terminals for which semi-persistent scheduling grant has been granted.

2. The method of claim 1, wherein the calculating the first and second estimated quantities comprises calculating the first and second quantities by considering all data radio bearers for a given mobile terminal to be active at the usage of semi-persistent scheduling for the mobile terminal.

3. The method of claim 1, wherein the calculating the first and second estimated quantities comprises calculating the first and second quantities by considering, for a given mobile terminal, all data radio bearers belonging to a logical channel group with a buffer estimate greater than zero to be active.

4. The method of claim 1, wherein the calculating the first and second estimated quantities comprises calculating the first and second quantities by considering, for a given mobile terminal, all data radio bearers belonging to a logical channel group with a buffer estimate greater than zero to be active at the usage of semi-persistent scheduling for the mobile terminal.

5. The method of claim 1, wherein the calculating the estimated quantity of active mobile terminals is further based on at least one of: an analysis of received data from one or more mobile terminals; and progress of retransmission activity for one or more mobile terminals.

6. The method of claim 5, wherein the analysis of received data from one or more terminals comprises an evaluation of activity history over a period of pre- determined length.

7. A method of estimating a quantity of mobile terminals that have buffered data for transmission to a base station, the method comprising:
   receiving buffer status reports from one or more mobile terminals served by the base station; and
   calculating an estimated quantity of active mobile terminals based on the received buffer status reports and on a number of mobile terminals for which a semi-persistent scheduling grant has been granted;
   wherein the calculating the estimated quantity of active mobile terminals comprises calculating the estimated quantity by considering all data radio bearers that are not assigned to a logical channel group to be active if the last received data for that data radio bearer had no padding.

8. A base station in a wireless communication network, the base station comprising:
   one or more radio circuits configured to receive buffer status reports from one or more mobile terminals served by the base station; and
   one or more processing circuits configured to calculate an estimated quantity of mobile terminals that have buffered data for transmission to the base station based on the received buffer status reports and on a number of mobile terminals for which a semi-persistent scheduling grant has been granted;
   wherein the one or more processing circuits are configured to calculate the estimated quantity of mobile terminals by calculating a first estimated quantity corresponding to mobile terminals having an active data bearer of a first traffic class; and
   wherein the one or more processing circuits are configured to calculate a second estimated quantity, corresponding to mobile terminals having an active data bearer of a second traffic class, based on the received buffer status reports and the number of mobile terminals for which semi-persistent scheduling grant has been granted.

9. The base station of claim 8, wherein the one or more processing circuits are configured to calculate the first and second estimated quantities by further considering all data radio bearers for a given mobile terminal to be active at the usage of semi-persistent scheduling for the mobile terminal.

10. The base station of claim 8, wherein the one or more processing circuits are configured to calculate the first and second estimated quantities by further considering, for a given mobile terminal, all data radio bearers belonging to a logical channel group with a buffer estimate greater than zero to be active.

11. The base station of claim 8, wherein the one or more processing circuits are configured to calculate the first and second estimated quantities by further considering, for a given mobile terminal, all data radio bearers belonging to a logical channel group with a buffer estimate greater than zero to be active at the usage of semi-persistent scheduling for the mobile terminal.

12. The base station of claim 8, wherein the one or more processing circuits are configured to calculate the estimated quantity of active mobile terminals further based on at least one of: an analysis of received data from one or more terminals; and progress of retransmission activity for one or more mobile terminals.

13. The base station of claim 12, wherein the analysis of received data from one or more terminals comprises an evaluation of activity history over a period of pre-determined length.

14. A base station in a wireless communication network, the base station comprising:
   one or more radio circuits configured to receive buffer status reports from one or more mobile terminals served by the base station; and
   one or more processing circuits configured to calculate an estimated quantity of mobile terminals that have buffered data for transmission to the base station based on the received buffer status reports and on a number of mobile terminals for which a semi-persistent scheduling grant has been granted;
   wherein the one or more processing circuits are further configured to calculate the estimated quantity of active mobile terminals by considering all data radio bearers that are not assigned to a logical channel group to be active if the last received data for that data radio bearer had no padding.

* * * * *